United States Patent Office 3,721,706
Patented Mar. 20, 1973

---

3,721,706
PERFLUORO-ALKYL-ALKYLENE-SULFONAMIDO-ALKYLENE-DIALKYLAMINES AND THEIR QUATERNARY AMMONIUM SALTS
Dieter Hoffmann, Burghausen, Saizach, Germany, and Hans Stach, Sao Paulo, Brazil, assignors to Farbwerke Hoechst Aktiengesellschaft vormals Meister Lucius & Bruning, Frankfurt am Main, Germany
No Drawing. Filed Mar. 17, 1971, Ser. No. 125,352
Claims priority, application Germany, Mar. 19, 1970,
P 20 13 104.8
Int. Cl. C07c *101/24*
U.S. Cl. 260—501.12                    6 Claims

ABSTRACT OF THE DISCLOSURE

Partially fluorinated paraffin sulfonic acid amides having in their amide moiety an alkylene group with a terminal tertiary amino group or a quaternary ammonium group are obtained by reacting a partially fluorinated paraffin sulfochloride with an N,N-dialkyl-alkylenediamine and, optionally, transforming the so-obtained sulfonic acid amides into their salts with acids or quaternizing agents. The products are useful as surface- or interface-active agents, especially as emulsifiers or foaming agents.

---

The present invention provides perfluoro-alkyl-alkylene-sulfonamido-alkylene amines and their derivatives of the general Formula I $$R_f-(CH_2)_n-SO_2-NH-(CH_2)_m-Y \quad (I)$$

in which $R_f$ is perfluoro-alkyl of 4 to 10 carbon atoms, $n$ is an integer of at least 2, preferably 2 or 4, $m$ is an integer of 2 to 6, preferably 2 or 3 and Y is a group of the formula

in which R' and R" are lower alkyl of, preferably, up to 4 carbon atoms, R''' is hydrogen, lower alkyl of, preferably, up to 4 carbon atoms or aralkyl of, preferably, up to 2 carbon atoms in the alkylene chain, especially a benzyl group, X is an anion, preferably a halide, especially chloride, sulfate, the anion of a low molecular fatty acid, especially acetate, or an anion of a mineral acid semi-ester, preferably an alkyl sulfate anion, in particular methosulfate, and A is lower alkylene of 1 to 4, preferably 1 or 2 carbon atoms.

Thus, the object of the invention are perfluoro-alkyl-alkylene-sulfonamido-alkylene-dialkylamines of the general Formula Ia

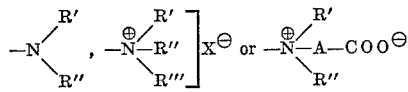

furthermore, the quaternary ammonium salts of the aforementioned compounds of the general Formula Ib

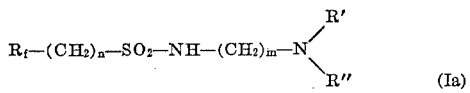

furthermore, the betains derived from the above-specified amines of the Formula Ia and corresponding to the general Formula Ic

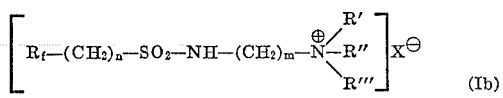

in which $R_f$, $n$, $m$, R', R", R''', A and X have the meanings given above, and furthermore a process for the manufacture of the above-specified amines of the Formula Ia and of the quaternary ammonium compounds (Ib) or betains (Ic) resulting therefrom by reaction of the corresponding sulfo-chlorides of the Formula II $$R_f-(CH_2)_n-SO_2Cl \quad (II)$$

in which $R_f$ and $n$ have the meanings given above, at temperatures in the range of from about $-20°$ C. up to about $+100°$ C., preferably at temperatures in the range of from about $0°$ to about $+40°$ C., wtih N,N-dialkyl-alkylene-diamines of the Formula III

in which $m$, R' and R" have the meanings given above and, if desired, subsequent quaternization by reaction with acids or quaternating agents to yield the corresponding quaternary ammonium salts (Ib), or with salts of halocarboxylic acids of the Formula IV $$Hal-(A)-COOMe \quad (IV)$$

in which Hal represents a halogen atom, Me represents an alkali metal atom or alkaline earth metal equivalent, and A has the meaning given above, or with lactones, preferably β-lactones, to yield the inner salts (Ic).

Perfluoro - alkyl - substituted sulfonamido-alkylene-dialkyl-amines of the formula

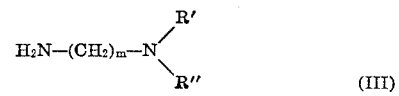

are known. They can be prepared according to the process described in U.S. Pat. 2,759,019 from perfluoro-alkyl-sulfo-fluorides of the formula $R_fSO_2F$ (accessible by electro-fluorination of alkane-sulfo-chlorides) by the reaction with N,N-dialkyl-alkylene-diamines. However, the yields of this reaction are unsatisfactory. The yield of crude amine indicated in the unique example indicated in this U.S. patent specification is only 60% of the theory.

Therefore, it was surprising that the reaction of the analogous perfluoro - alkyl - alkylene-sulfo-chlorides proceeded essentially smoother and gave almost quantitative yields.

The starting substances of the Formula II are known and can be obtained, for example, according to the process described in the German Offenlegungsschrift 1,942,264 by oxidation of the corresponding rhodanides (thiocyanates) with chlorine. The sulfo-chlorides may also be obtained in advantageous manner from halides of the formula $$R_f-(CH_2)_n-Hal$$

by reaction with thio-urea to yield isothiouronium salts and their known conversion into mercaptanes and oxidation of the mercaptanes with chlorine in an aqueous acidic solution.

The process of the invention is carried out as follows: perfluoro-alkyl-alkylene-sulfo-chlorides of the general Formula II are reacted with N,N-dialkyl-alkylene-diamines of the Formula III in the presence of an acid-binding agent. As acid binding agent, an excess of diamine is preferably used. However, a tertiary amine, for example pyridine, triethyl-amine or a picoline may be used.

In view of the fact that all substances present in the reaction mitxure, with the exception of the corresponding perfluoro - alkyl - alkylene-sulfonamido-alkylene-dialkyl-amines (Ia), are soluble in water, these desired compounds can be easily separated by dispersion in water and isolated according to conventional methods.

The following Table 1 lists the melting points of some of the amines of the invention:

TABLE 1

| Compounds: | Melting point, °C. |
|---|---|
| $C_4F_9CH_2CH_2SO_2NH(CH_2)_3N(CH_3)_2$ | 65 |
| $C_6F_{13}CH_2CH_2SO_2NH(CH_2)_3N(CH_3)_2$ | 77 |
| $C_6F_{13}CH_2CH_2SO_2NH(CH_2)_2N(C_2H_5)_2$ | (1) |
| $C_8F_{17}CH_2CH_2SO_2NH(CH_2)_3N(CH_3)_2$ | 78 |
| $C_{10}F_{21}CH_2CH_2SO_2NH(CH_2)_3N(CH_3)_2$ | 135 |
| $C_6F_{13}CH_2CH_2SO_2NH(CH_2)_3N(CH_3)_2$ | 63 |

[1] Colourless oil.

In the second stage, the amines can be converted into salts. This can be effected by normal salt formation with acids, preferably mineral acids or carboxylic acids, for example HCl, HBr, $H_2SO_4$ or low molecular aliphatic carboxylic acids, for example, acetic acid. According to a preferred mode of operation, the amines are reacted with lower alkyl or lower aralkyl-halides, for example with methyl chloride, ethyl bromide, t-butyl chloride or benzyl chloride. It is also possible to use other conventional quaternating agents, for example mineral acid esters, such as a dialkyl sulfate, in particular dimethyl sulfate. This reaction is carried out with equimolar amounts of amine and quaternating agent or with an excess of quaternating agent in a polar solvent, for example in a lower alcohol, at temperatures in the range of from about 40° C. up to the boiling point of the solvent. The reaction is completed when free tertiary amine can no longer be detected. After removal of the solvent, the corresponding quaternary ammonium compounds (Ib) remain behind.

The preparation of the betains (Ic) is carried out by reaction of the above-mentioned amine with lower aliphatic halocarboxylic acids, preferably chloro-carboxylic acids of the formula Cl—A—COOH, in which A has the meaning given above, preferably in an aqueous medium at temperatures in the range of about 80 to about 100° C. The acids are used in this case preferably in the form of their neutral alkaline earth metal salts, especially alkali metal salts. Instead of halo-carboxylic acids or their salts, lactones, preferably $\beta$-lactones may also be used for the formation of the betains, such as, for example, $\beta$-propiolactone. The reaction is completed when free tertiary amine can no longer be detected. After evaporation of the water, the betains which still contain a metal halide are taken up suitably in absolute ethanol, whereupon only the metal halide remains behind in soluble form and can be removed by filtration. After removal of the solvent, the pure betains (Ic) are obtained.

The compounds obtained according to the invention may be used as surface-active or interface-active agents, for example wetting and foaming agents, emulsifiers and dispersants. In this respect the quaternary ammonium compound (Ib) and betains (Ic) are especially useful, because these compounds become water-soluble by the introduction of the quaternary nitrogen atom and can therefore also be used in aqueous systems. The perfluoroalkyl group imparts onto the substances a hydrophobic and oleophobic activity, whereas the alkylene groups promote solubility in organic compounds such as oils, waxes and solvents, resulting in a surface- and interface-activity in these substances. The properties of the compounds of the invention can be modified by variation of the perfluoro-alkyl group $R_f$, of the alkylene groups $—(CH_2)_n—$ and $—(CH_2)_m—$ as well as of the groups R', R" and R''' and adapted exactly to the requirements of each individual case. An additional possibility of varying the solubility in organic solvents is given by the presence of the two separated alkylene groupings in the molecule.

In dry-cleaning of textiles as well as in degreasing glass or metal surfaces, halogenated hydrocarbons, especially trichloro-ethylene, perchloro-ethylene and 1,1,2-trifluorochloro-ethane are used. In order also to remove water-soluble dirt particles, it is suitable to introduce 1 to 10%

TABLE 2

| Compound | Surface tension [1] 0.1%, 20° C., dyn./cm. | Foam [2] Immediately | Foam [2] After 5 min. |
|---|---|---|---|
| 1. $C_4F_9CH_2CH_2SO_2NH(CH_2)_3\overset{+}{N}(CH_3)_3Cl^-$ | 23 | 12 | 10 |
| 2. $C_4F_9CH_2CH_2SO_2NH(CH_2)_3\overset{+}{N}(CH_3)_2CH_2C_6H_5Cl^-$ | 26 | 0 | 0 |
| 3. $C_4F_9CH_2CH_2SO_2NH(CH_2)_3\overset{+}{N}(CH_3)_2CH_2COO^-$ | 22 | 5 | 0 |
| 4. $C_6F_{13}CH_2CH_2SO_2NH(CH_2)_3\overset{+}{N}(CH_3)_3Cl^-$ | 27 | 90 | 80 |
| 5. $C_6F_{13}CH_2CH_2SO_2NH(CH_2)_3\overset{+}{N}(CH_3)_2CH_2C_6H_5Cl^-$ | 21 | 225 | 220 |
| 6. $C_6F_{13}CH_2CH_2SO_2NH(CH_2)_3\overset{+}{N}(CH_3)_2CH_2COO^-$ | 17 | 90 | 90 |
| 7. $C_6F_{13}CH_2CH_2SO_2NH(CH_2)_2\overset{+}{N}(C_2H_5)_2CH_3Cl^-$ | 28 | 170 | 155 |
| 8. $C_6F_{13}CH_2CH_2SO_2NH(CH_2)_2\overset{+}{N}(C_2H_5)_2CH_2C_6H_5Cl^-$ | 20 | 175 | 170 |
| 9. $C_6F_{13}CH_2CH_2SO_2NH(CH_2)_2\overset{+}{N}(C_2H_5)_2CH_2COO^-$ | 18 | 220 | 215 |
| 10. $C_8F_{17}CH_2CH_2SO_2NH(CH_2)_3\overset{+}{N}(CH_3)_3Cl^-$ | 25 | 190 | 190 |
| 11. $C_8F_{17}CH_2CH_2SO_2NH(CH_2)_3\overset{+}{N}(CH_3)_2CH_2C_6H_5Cl^-$ | 24 | 145 | 140 |
| 12. $C_8F_{27}CH_2CH_2SO_2NH(CH_2)_3\overset{+}{N}(CH_3)_2CH_2COO^-$ | 20 | 18 | 15 |
| 13. $C_{10}F_{21}CH_2CH_2SO_2NH(CH_2)_3\overset{+}{N}(CH_3)_2CH_2COO^-$ | 40 | 0 | 0 |
| 14. $C_6F_{13}(CH_2CH_2)_2SO_2NH(CH_2)_3\overset{+}{N}(CH_3)_2CH_2COO^-$ | 19 | 60 | 60 |
| 15. $C_6F_{13}CH_2CH_2SO_2NH(CH_2)_2\overset{+}{N}(C_2H_5)_2CH_2CH_2COO^-$ | 18.5 | 70 | 70 |

[1] Measured according to the ring tear-off method (Lecomte du Nouy, J. Gen. Physiol. 1 (1925) 627).
[2] Oil and Soap 18, 99 (1941), DIN 53902, Testing of surface-active substances, determination of foaming capacity according to the Ros-Miles process using 0.1% at 25° C.

of water by emulsification into these solvents. Small amounts of the quaternary ammonium salts or betains of the invention permit to reduce the normally required amount of emulsifier to half of this quantity and to introduce nevertheless the same amount of water by emulsification.

Some of the ammonium compounds II and betains III of the present invention and their properties as surface-active agents are listed in Table 2 (see col. 4).

It can be seen from Table 2 that some compounds, when used at a rate of 0.1% only, lower the surface tension of water from 72 dyn/cm. to below 20 dyn/cm. With compound 5 of Table 2, for example, 20 dyn/cm. are obtained with a concentration of 50 p.p.m.

The influence of the stability of the foam produced with the compounds becomes apparent when varying the chain length $R_f$. Especially the compounds (5), (7), (8), (9) and (10) listed in Table 2 are extra-ordinarily good and stable foaming agents.

The following examples illustrate the invention:

EXAMPLE 1

92 g. of $C_4F_9CH_2CH_2SO_2Cl$ were dissolved in 200 ml. of diethyl ether and added slowly, while stirring, to a cooled solution of 136 g. of $H_2N(CH_2)_3N(CH_3)_2$ in 100 ml. of diethyl ether. Stirring was continued for 2 hours at 25° C. and the etheral solution was shaken twice with water. The ethereal phase was dispersed in water and the ether was removed by application of reduced pressure. Thereupon, a white flakey precipitate separated. After filtration and drying under reduced pressure, 103 g. of pure $C_4F_9CH_2CH_2SO_2NH—(CH_2)_3N(CH_3)_2$ melting at 65° C. were obtained. Analysis showed that the compound had a content of tertiary nitrogen of 3.26% (theory: 3.39%).

EXAMPLE 2

115 g. of $C_6F_{13}(CH_2)_2SO_2Cl$ were dissolved in 200 ml. of di-isopropyl ether and added dropwise, while stirring, to a cool solution of 150 g. of $H_2N\ (CH_2)_2N(C_2H_5)_2$ in 100 ml. of di-isopropyl ether. When the reaction was completed, the ethereal phase was washed with a dilute solution of sodium chloride and the ether was removed under reduced pressure. Yield: 139 g. of colourless oil having the composition $$C_6F_{13}(CH_2)_2SO_2NH(CH_2)_2N(C_2H_5)_2$$

Found: 2.62% of tertiary nitrogen (theory: 2.66%).

EXAMPLE 3

40 g. of $C_6F_{13}CH_2CH_2SO_2NH(CH_2)_3(CH_3)_2$ melting at 77° C. (prepared according to Example 1) were dissolved in 100 ml. of isopropanol and reacted at 80° C. in a glass autoclave provided with a stirrer with methyl chloride at a pressure of 2 atmospheres gauge. The uptake of methyl chloride was completed after 3 hours. The solution was free from basic, tertiary amine. After evaporation of the isopropanol, 41.7 g. of white, water-soluble powder having the composition

$C_6F_{13}CH_2CH_2SO_2NH(CH_2)_3\overset{\oplus}{N}(CH_3)_3]Cl^-$ remained behind. Analysis showed a proportion of sulfur to nitrogen of 1:2. The proportion of ionogenic chloride was found to be 6.30% (theory: 6.32%).

EXAMPLE 4

25 g. of $C_4F_9CH_2CH_2SO_2NH(CH_2)_3N(CH_3)_2$ were heated under reflux with 7.8 g. of freshly distilled benzyl-chloride and 100 ml. of ethanol until basic tertiary amine could no longer be detected, which required about 7 hours. After evaporation of the ethanol, 32.5 g. of a white, water-soluble powder having the composition

were obtained.

EXAMPLE 5

25 g. of $C_8F_{17}CH_2CH_2SO_2NH(CH_2)_3N(CH_3)_2$ (prepared according to Example 1) were heated, while stirring, to 90° C. together with 4.8 g. of $ClCH_2COONa$ in 300 ml. of water, until free tertiary amine was no longer present and a clear solution had formed. The water was removed at 60° C. in a drying cabinet operating with cycling air and the remaining substance was completely dried under reduced pressure. After having dissolved the substance in about 100 ml. of absolute ethanol, the sodium chloride that had separated was filtered off and the solvent was removed by evaporation. 25.7 g. of water-soluble powder of the formula

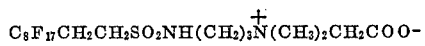
$C_8F_{17}CH_2CH_2SO_2NH(CH_2)_3\overset{+}{N}(CH_3)_2CH_2COO^-$ were obtained.

Analysis: 35.6% C; 3.2% H; 39.3% F; 4.6% N; 5.5% S (Theory: 35.8% C; 3.3% H; 39.1% F; 4.9% N; 5.6% S).

All other compounds listed in Tables 1 and 2 were prepared according to the above-described examples.

EXAMPLE 6

30 g. of $C_6F_{13}CH_2CH_2SO_2NHCH_2CH_2N(C_2H_5)_2$, dissolved in 300 ml. of ether were introduced in a flask provided with a stirrer and then a solution of 4.1 g. of propiolactone in 60 ml. of ether was added dropwise with 30 minutes at 15° C. The whole was stirred for 2 hours at 30° C. and the ether was removed in a rotary evaporator. Yield: 33 g. of a product having the formula

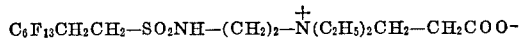
$C_6F_{13}CH_2CH_2—SO_2NH—(CH_2)_2—\overset{+}{N}(C_2H_5)_2CH_2—CH_2COO^-$ were obtained. (Colourless oil, dates see Table 2.)

The following example illustrates the activity of the compounds of the invention as emulsifiers for water in a low molecular halogenated hydrocarbon, thus for the preparation and stabilization of a water-in-oil-emulsion as that commonly used in dry-cleaning and the advantages obtained.

EXAMPLE 7

The attempt was made to prepare a stable emulsion with 5% water in trifluoro-trichloro-ethane. The following amounts of two commercial emulsifiers commonly used for this purpose were employed:

| Percent of— | |
|---|---|
| Emulsifier I [1] | Emulsifier II [2] |
| 3.0 | 2.0 | Stable solubilized emulsion.
| 1.5 | 1.0 | No emulsion.

[1] On the basis of nonylphenol-polyglycol ether (containing about 4 moles of ethylene oxide per mol of phenol).
[2] Aqueous/butanolic solution of (essentially) benzene sulfonic acid (alkali metal salt).

Upon addition of 0.1% of compound (9) of Table 2 even 1.5% of emulsifier I and 1.0% of emulsifier II, respectively, were sufficient to produce a stable and solubilized emulsion.

We claim:
1. A compound of the formula

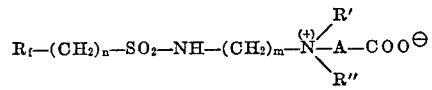
$$R_f—(CH_2)_n—SO_2—NH—(CH_2)_m—\overset{(+)}{N}\underset{R''}{\overset{R'}{\diagup}}—A—COO^{\ominus}$$

in which $R_f$ is perfluoroalkyl of 4 to 10 carbon atoms, $n$ is an integer of 2 to 4, $m$ is an integer of 2 to 6, $R'$ and $R''$ are lower alkyl and A is lower alkylene.

2. The compound as claimed in claim 1, wherein $R_f$ is n-perfluorohexyl, $n$ is 2, $m$ is 3, $R'$ and $R''$ are methyl and A is methylene.

3. The compound as claimed in claim 1, wherein $R_f$ is n-perfluorohexyl, $n$ is 2, $m$ is 2, $R'$ and $R''$ are ethyl and A is methylene.

4. The compound as claimed in claim 1, wherein $R_f$ is n-perfluorohexyl, $n$ is 2, $m$ is 2, $R'$ and $R''$ are ethyl and A is ethylene.

5. The compound as claimed in claim 1, wherein $R_f$ is n-perfluorohexyl, $n$ is 4, $m$ is 3, $R'$ and $R''$ are methyl and A is methylene.

6. The compound as claimed in claim 1, wherein $R_f$ is n-perfluorooctyl, $n$ is 2, $m$ is 3, $R'$ and $R''$ are methyl and A is methylene.

References Cited
UNITED STATES PATENTS
3,147,065   9/1964   Koshar et al. __ 260—567.6 M X
2,764,602   9/1956   Ahlbrecht ____ 260—501.13 X LEON ZITVER, Primary Examiner M. W. GLYNN, Assistant Examiner

U.S. Cl. X.R.
260—459, 501.2, 567.6 M, 583 EE; 252—307, 357